UNITED STATES PATENT OFFICE.

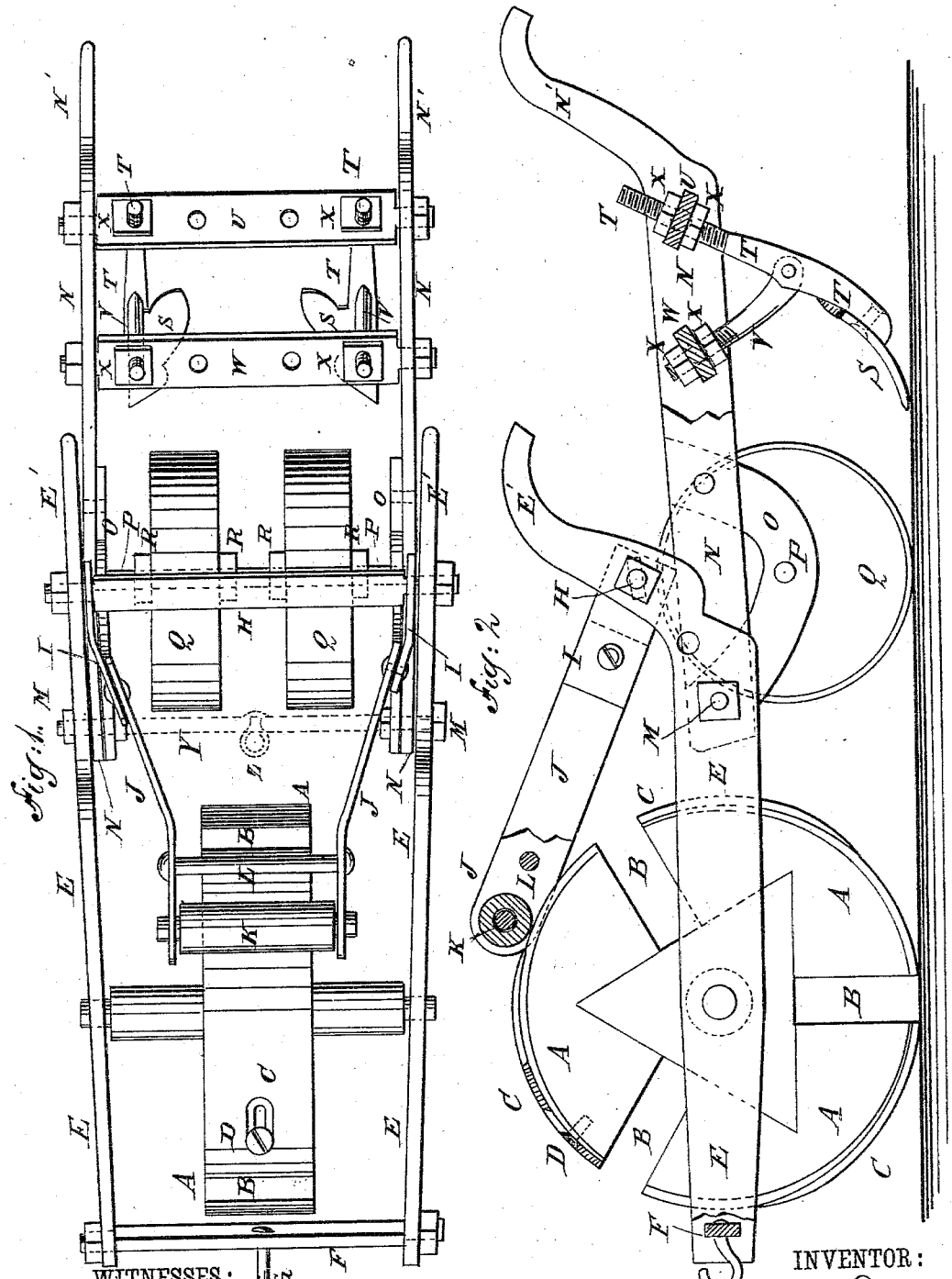

RICHARD R. PACE, OF LINEVILLE, ALABAMA.

COTTON-CHOPPER.

SPECIFICATION forming part of Letters Patent No. 281,125, dated July 10, 1883.

Application filed March 12, 1883. (No model.)

*To all whom it may concern:*

Be it known that I, RICHARD ROBERTSON PACE, of Lineville, in the county of Clay and State of Alabama, have invented certain new and useful Improvements in Cotton-Choppers, of which the following is a full, clear, and exact description.

Reference is to be had to the accompanying drawings, forming part of this specification, in which similar letters of reference indicate corresponding parts in both the figures.

Figure 1 is a plan view of my improvement. Fig. 2 is a side elevation of the same, parts being broken away.

The object of this invention is to facilitate the chopping of cotton to a stand.

The invention consists in a cotton-chopper constructed with a chopping-wheel having radial slots and journaled to a frame, a roller journaled to a hinged frame and resting upon the chopping-wheel to clear its slots of soil, and side rollers for crushing the straggling stalks, the said side rollers being journaled to a frame and followed by plows, whereby the plants for a stand will be left uninjured, the plants between the hills will be destroyed and covered with soil, and the standing plants will be dirted. To the face of the chopping-wheel are bolted curved and slotted plates, by the adjustment of which the mouths of the radial slots can be regulated in size. The standards and braces of the plows are secured by nuts to the cross-bars of the frame that supports them, and which have two or more sets of perforations to receive the said standards and braces, so that the plows can be readily adjusted to work deeper or shallower in the ground, and at a greater or less distance from each other, as will be hereinafter fully described.

A represents the chopping-wheel, which may be made of any desired thickness and size. In the face of the wheel A are formed three (more or less) equidistant radial slots, B, according to the size of the wheel, the number of slots being such that the space on the face of the wheel between two adjacent slots will be equal to the required distance apart of the hills of cotton, and the width of the slots being such as to leave the desired amount of cotton for a stand. Upon the face of the wheel A, at one side of each slot B, is placed a metal plate, C, which is curved upon the arc of the rim of the said wheel A, and is slotted longitudinally to receive the screw or bolt D, by means of which the said plate C is secured in place. With this construction, where the wheel A is rolled forward along a row of plants, the plants that are to be left for a stand enter the slots B and are uninjured, but the other plants are crushed down and destroyed by the solid parts of the said wheel.

By adjusting the plates C the mouths of the slots B can be made wider or narrower, so as to leave more or less cotton for a stand, as may be desired.

The journals of the chopping-wheel A revolve in the bars E, which are connected at their forward ends by a cross-bar, F, having a hook, G, attached to its center for the attachment of the draft. The rear ends, E', of the side bars, E, are curved upward and rearward, to adapt them to serve as handles for guiding and controlling the chopper when the forward part of the machine is used alone.

To the rear parts of the side bars, E, or to the lower parts of the handles E', are attached the ends of a cross-bar, H, to the end parts of which are attached short projecting arms I, to which are hinged by bolts, screws, or rivets, the rear ends of two bars, J, to and between the forward ends of which is pivoted a roller, K, of a diameter a little less than the width of the mouths of the slots B. The roller K rests and rolls upon the face of the wheel A and drops into the mouth of each slot B, so as to knock out any soil that may be in the mouths of the said slots, and thus keep the said slots clear. The bars J are connected a little in the rear of the roller K by a bar, L, which also serves as a stop to prevent the said roller K from dropping so far into the slots B as to check the revolution of the chopping-wheel A.

To the rear parts of the side bars, E, are hinged by bolts M the forward ends of the side bars, N, upon the forward parts of which are formed or to them are attached hangers O.

In bearings in the hangers O revolve the journals of the shaft P, upon which, at the opposite sides of and equally distant from its center, are placed two wheels, Q, which are secured in place adjustably by nuts R, screwed upon the shaft P, one upon each side of each wheel Q, so that by turning the said nuts R the wheels Q can be adjusted wider apart or closer together, as may be desired. The wheels Q are made with wide rims, so that as the machine is drawn forward along a row of plants the said wheels will crush down and destroy the side and straggling plants, so as to leave compact hills of a width depending upon the distance apart of the wheels Q. The stalks crushed down by the wheels A Q are covered with soil and the hills of plants are dirted by plows S, attached to the lower ends of the standards T, the upper ends of which pass up through holes in a cross-bar, $u$, attached at its ends to the rear parts of the side bars, N.

The draft-strain upon the standards T is sustained by braces V, the lower ends of which are attached to the middle parts of the said standards T. The upper ends of the braces V pass up through holes in a cross-bar, W, attached to the side bars, N, a little in front of the cross-bar U. The upper ends of the standards T and braces V have screw-threads cut upon them to receive the nuts X, which are screwed upon them above and below the cross-bars U W, so that by turning the said nuts X up or down the standards T will be adjusted to cause the plows S to work deeper or shallower in the ground. Several sets of holes are formed in the cross-bars U W, to receive the upper ends of the standards T and braces V, so that the said standards can be adjusted to cause the plows S to work wider apart or closer together, as may be desired.

The rear ends, N', of the side bars, N, are extended upward and rearward, to serve as handles in guiding and controlling the machine.

In the case of rough ground the bolts M can be detached and the forward ends of the side bars, N, can be connected by a cross-bar, Y, provided with a draft hook or eye, Z, as indicated in dotted lines in Fig. 1, so that the two parts of the machine can be used separately.

I am aware that it is old to provide the radially-slotted wheel with laterally-removable plates or hoes, which are exchangeable for different-sized plates or hoes, to vary the size of the mouths of the slots.

Having thus described my invention, what I claim as new, and desire to secure by Letters Patent, is—

1. A cotton-chopper constructed substantially as herein shown and described, and consisting of the chopping-wheel having radial slots and its frame, a slot-clearing roller and its frame, and side rollers, and plows and standards and their frame, as set forth.

2. In a cotton-chopper, the chopping-wheel provided with radial slots, in combination with curved plates adjustable in the plane of the periphery of the wheel to vary the size of the mouths of the slots, substantially as and for the purpose set forth.

3. In a cotton-chopper, the combination, with the chopping-wheel A, having radial slots B, and its frame E, of the roller K, and its frame J L, substantially as herein shown and described, whereby the slots of the chopping-wheel will be kept clear, as set forth.

4. In a cotton-chopper, the combination, with the chopping-wheel A and its frame E, of the pair of laterally-adjustable wheels Q and the frame N, substantially as herein shown and described, whereby the straggling plants will be crushed and the hills can be made of any desired width, as set forth.

5. In a cotton-chopper, the combination, with the frame E, of the removable hinged frame N, the side rollers or wheels, Q, the cross-bars U W, the plow-standard T, and the brace V, substantially as and for the purpose set forth.

RICHARD R. PACE.

Witnesses:
ISAIAH F. COLE,
DAVID A. WOOD.